Nov. 11, 1941.  E. K. NICKERSON  2,262,726
PIVOTED DISK VALVE APPARATUS
Filed Nov. 18, 1939
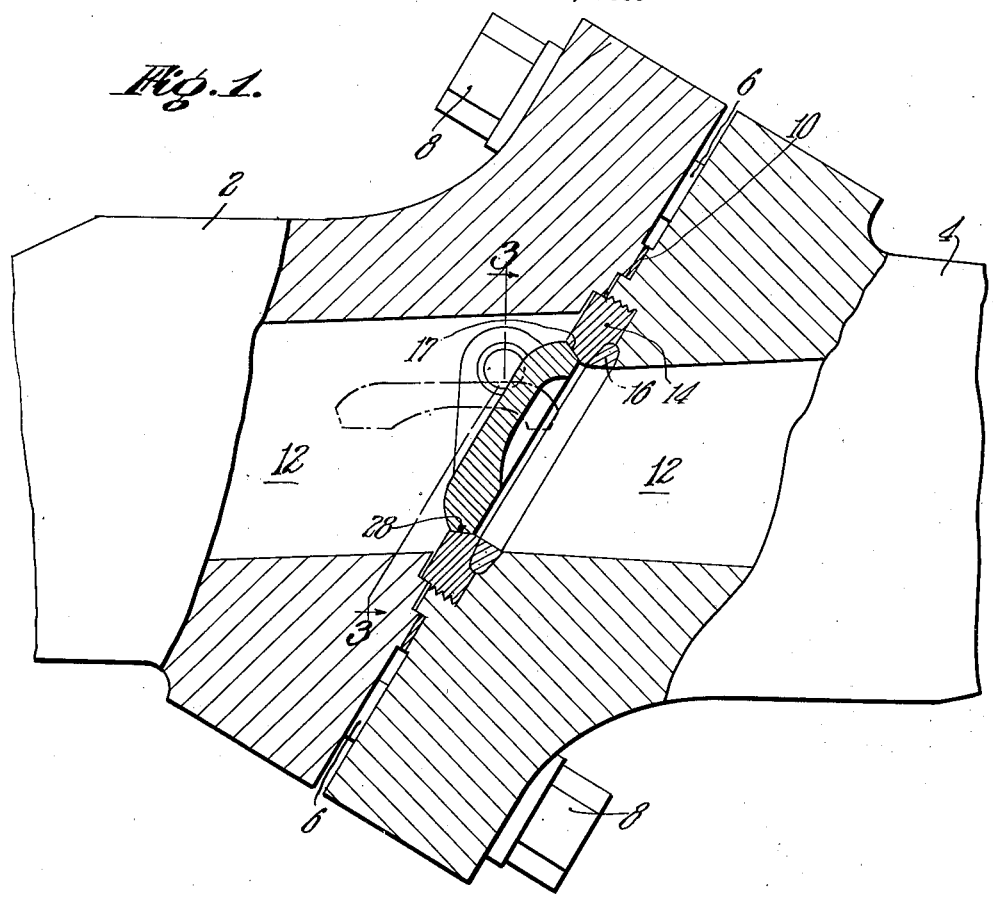
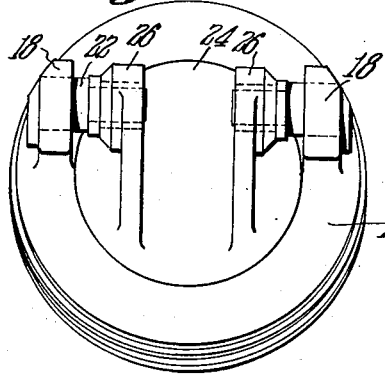
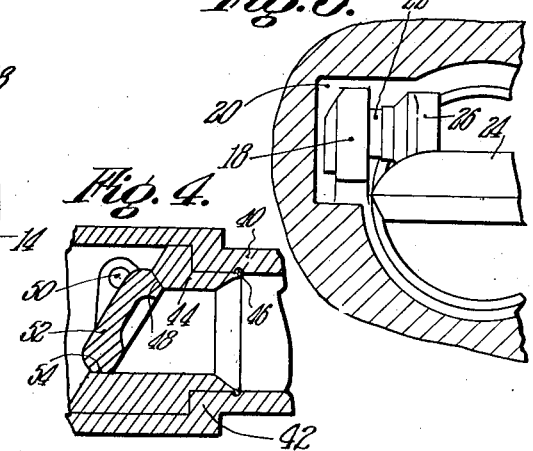
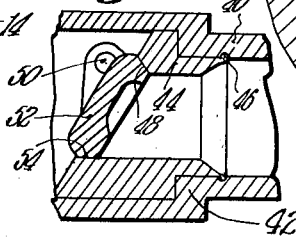
INVENTOR.
Elmer K. Nickerson.
BY Walter C. Ross.
ATTORNEY.

Patented Nov. 11, 1941

2,262,726

UNITED STATES PATENT OFFICE 2,262,726

PIVOTED DISK VALVE APPARATUS

Elmer K. Nickerson, Springfield, Mass., assignor to The Chapman Valve Manufacturing Co., Indian Orchard, Mass., a corporation of Massachusetts Application November 18, 1939, Serial No. 305,117

3 Claims. (Cl. 251—123)

This invention relates to improvements in valve apparatus and is directed more particularly to a novel valve construction of the type where a disk is pivoted for swinging movements relative to or towards and away from a seat.

As will appear, the valve apparatus of this invention is adapted for use in any type of pipe line through which a fluid is intended to flow and it is adapted to automatically stop said flow when desired. As one example, the apparatus may be so constructed that when a pump in the pipe line at the rear of the valve is put out of operation, for some reason, the valve will close automatically to prevent back-flow of the fluid.

While the apparatus of the invention is essentially of the check or non-return type, it may be of the so-called reflux, outfall, pump, pipe-intake, or draw-off type. As will be obvious, the ends of the apparatus may be of the screw, flange, bell, bell and spigot, or spigot type so that it is capable of installation in all kinds of pipe lines.

The principal objects of the invention are directed to a novel valve apparatus wherein a disk is pivoted to a ring or seat with which it co-operates. The construction is such that the disk and seat constitute a unitary structure and this is adapted to be readily associated or inserted in a valve structure as a separate entity in contra-distinction to present-day apparatuses of the same general type where the disk and seat are entirely separate.

That is to say, valves of the type to which this invention relates usually comprise separate half-parts, or forward and rear members, which are secured together with a valve seat or ring secured in one part and a disk pivoted in the other part for swinging movements relative to the seat on an axis disposed at a side of the center of the disk. For proper operation of such conventional apparatus it is obvious that the disk and seat with which it co-operates must be machined and fitted in their respective half-parts with precision and that to obtain the desired coaction of disk and seat and the proper swinging of the disk, the pivotal connection of the latter must be accurately disposed with respect to both the forward and rear members and the seat.

Since, however, the seat is associated with a different and separate part of the valve structure from the one to which the disk is pivoted, it is extremely difficult, if not impossible, to machine or fit the parts of the housing so that when secured together the seat and disk are positioned and co-related to the fine degree of accuracy that is desired. It will be readily appreciated that, regardless of the precision one might obtain on the engaging parts of the disk and seat, any inaccuracies of the housing parts will position the disk and seat ring in such a way as to destroy or negative the fine machining accomplished on the valve proper.

Various other novel features and advantages of the invention will be hereinafter more fully referred to in connection with the accompanying description of the invention, in the present preferred form thereof, reference being had to the accompanying drawing wherein:

Fig. 1 is an elevational view with parts in section showing the valve apparatus of the invention;

Fig. 2 is a front elevational view of the unitary disk and seat structure;

Fig. 3 is a sectional view on the line 3—3 of Fig. 1 with the valve in open position; and Fig. 4 is a view similar to Fig. 1 showing a modification of the invention.

Referring now to the drawing more in detail, the invention will be fully described.

There are two half-parts, or forward and rear members, of a housing represented by 2 and 4. These are adapted, as stated above, to be inserted in any kind of a pipe line, their ends (not shown) being of any necessary design to facilitate their securing to the adjacent ends of the pipe sections.

The adjacent ends of the forward and rear members are preferably flanged as shown and are adapted to be secured in adjacency in some manner as by clamping bolts 6 and 8. One of the bolts 6 or 8 may be associated with the forward member 2 and the other with the rear member 4, each being capable of being tightened so as to cause the oppositely-disposed parts to move towards one another.

There may, of course, be any desired number of clamping bolts, their purpose being to draw the half-parts together and secure them in the relation shown. There may or may not be packing 10 between the adjacent faces of members 2 and 4.

The members of the housing, of course, have bores 12 therethrough which coincide with one another and with the bores of the pipe sections when the apparatus is in operating position. The bore in rear member 4 is the inlet side of the valve and the bore in member 2 is the outlet side. That is to say, for purposes of description an apparatus is shown wherein the fluid is adapted to flow from right to left.

Associated with the forward end of what may be called the inlet part of the housing is an annular seat ring or supporting member 14. This carries the valve parts of the invention in a manner presently to be described and may be associated with either of the half members in any one of various ways.

In the drawing, however, the seat ring or supporting part 14 is shown in threaded engagement with the body member 4 and welded thereto as indicated at 16. It obviously could be merely seated in a recess provided in the part 4 and held thereagainst by means of the clamping action of part 2 through bolts 6 and 8. Again it could be secured in place merely by the welding.

The arrangement shown, I have found, is to be preferred as it makes for ease and efficiency in assembly and assures that the ring member 14 is accurately located with respect to the various parts and securely held against displacement from such location.

In any event, the part 14 has a ring-like seating surface 17 which is preferably beveled or angularly-disposed with respect to the vertical as shown for reasons soon to be pointed out. It will also be noted that in the drawing the adjacent faces of members 2 and 4 are angularly-disposed with respect to the vertical but this is not essential.

The body part 14 is formed to have integral, forwardly extending lugs or ears 18 on opposite sides thereof. These ears 18 are preferably in horizontal alignment and closely adjacent opposite sides of the forward face of the part 14.

To accommodate these ears 18 the housing part 4 is enlarged to have recesses 20 at opposite sides thereof, as shown more clearly in Fig. 3. Extending inwardly towards one another from each ear 18 is a shaft 22.

A disk member 24 has spaced outwardly-extending lugs 26 which receive the inner or adjacent ends of the shafts 22 as shown. The disk 24 is adapted to pivot on shafts 22 and thus be tiltable relative to the member 14 with which the ears 18 are integral.

The disk's inner face has a beveled ring-like seat 28 which is complemental to the beveled seat 17.

It will be noted that the pivots 22 are above the center of the disk and, of course, forwardly of the co-operating seats 17 and 28. Thus the disk is capable of a bell-crank movement and readily clears the seat as it tilts or pivots without rubbing.

That is to say, the angles of the seat bevel and the valve seat and the disk's pivotal point are such that every part of the disk's edge lifts freely out of contact with the seat 17 when the valve opens and drops into contact when closing, with no sliding or wearing of the seats. This not only saves wear of the parts but makes for tight closing without slam.

The inclined angle of the seats, furthermore, reduces the distance which the disk must travel from its wide open position to its seat to a minimum. The locating of the disk's pivot just above its center serves to partially balance the disk and, together with the bevels of the seats, creates a cushioning effect which is desirable.

In Fig. 4 I have shown a modification of the valve apparatus of the invention. Here the unitary disk and seat structure is inserted in a valve body indicated generally by 40 and having the outlet side of its bore enlarged to provide a shoulder 42. Said body 40 may be a unitary member as shown or it may be in sections.

The unitary valve structure is inserted into the body 40 from its enlarged side and its body or supporting part 44 in engagement with the said shoulder 42. Preferably said part 44 is welded in place as indicated at 46.

The part 44 may, of course, be variously formed but in any event it has a beveled seat 48 and has pivoted thereto on pivot 50 a disk 52 provided with a beveled seating surface 54. The disk is adapted to tilt and co-operate with the seat of the body member to which is attached in the same manner as disk member 24 pivots relative to body 14 to which, of course, it is hinged.

While I have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What it is desired to claim and secure by Letters Patent of the United States is:

1. A high pressure check valve construction comprising in combination, separable forward and rear members for securing in a pipe line having substantially aligned passageways therethrough and substantially flat adjacent faces, means for securing said members together, the face of the forward member provided with a recess around the passageway therethrough, a ring member seated in said recess having a passageway therethrough and provided with a tapering seat around said passageway on the face thereof adjacent said rear member, a disk for seating on said seat, connections associated with said ring member and disk independent of the rear member pivotally connecting said seat and disk and above said seat member and disposed entirely in the passageway of the rear member, means securing said ring member in said recess; and packing means independent of said ring member between the faces of said forward and rear members, sealing said faces, all adapted and arranged whereby the said rear and forward members may be separated without effecting the connection of the disk and seat member.

2. A high pressure check valve construction comprising in combination, separable forward and rear members for securing in a pipe line provided with substantially aligned passageways therethrough, means for securing said members together, said members having substantially flat adjacent faces, the face of the forward member provided with a recess around the passageway thereof, a ring member seated in said recess provided with a passageway therethrough and a tapering seat around the passageway on the face thereof adjacent the rear member, the face of the rear member provided with a portion overlying the marginal portions of said face of the ring member, a disk for engaging said seat of the ring member, pivotal connections connecting said disk and ring member disposed at a side of the axis of the disk and wholly within the passageway of the rear member whereby the disk may swing between closed and open positions in said passageway and independently thereof, means securing said ring member in said recess, and packing means independent of the ring member between the faces of the forward and rear members sealing said faces, all adapted and arranged whereby as fluid flowing through the valve moves the disk to open position the pivotal connections are at a side of said disk away from the axis of the passageways and out of the central main flow of fluid.

3. A high pressure check valve construction comprising in combination, separable forward and rear members for securing in a pipe line provided with substantially aligned passageways therethrough, means for securing said members together, said members having substantially flat adjacent faces, the face of the forward member provided with a recess around the passageway thereof, a ring member seated in said recess provided with a passageway therethrough and a tapering seat around the passageway on the face thereof adjacent the rear member, the face of the rear member provided with a portion overlying the marginal portions of said face of the ring member, a disk for engaging said seat of the ring member, pivotal connections connecting said disk and ring member disposed at a side of the axis of the disk and wholly within the passageway of the rear member whereby the disk may swing between closed and open positions in said passageway and independently thereof whereby a fluid flowing through the valve moves the disk to open position the pivotal connections are at a side of said disk away from the axis of the passageways and out of the central main flow of fluid, said connections including ears on opposite sides of said ring and lugs on the disk adjacent thereto and pivot means associated with said lugs and ears means securing said ring member in said recess, and packing means independent of the ring member between the faces of the forward and rear members sealing the same.

ELMER K. NICKERSON.